United States Patent
Hodgman et al.

(10) Patent No.: US 10,979,454 B1
(45) Date of Patent: Apr. 13, 2021

(54) MONITORING SCAN ATTEMPTS IN A NETWORK

(71) Applicant: Rapid7, Inc., Boston, MA (US)

(72) Inventors: Roy Hodgman, Cambridge, MA (US); Jeffrey D. Myers, Cambridge, MA (US)

(73) Assignee: Rapid7, Inc., Boston, MA (US)

( * ) Notice: Subject to any disclaimer, the term of this patent is extended or adjusted under 35 U.S.C. 154(b) by 121 days.

(21) Appl. No.: 16/546,663

(22) Filed: Aug. 21, 2019

Related U.S. Application Data

(63) Continuation of application No. 15/349,069, filed on Nov. 11, 2016, now Pat. No. 10,447,734.

(51) Int. Cl.
    *H04L 29/06* (2006.01)

(52) U.S. Cl.
    CPC ...... *H04L 63/1491* (2013.01); *H04L 63/0281* (2013.01); *H04L 63/1408* (2013.01)

(58) Field of Classification Search
    CPC .................................................. H04L 63/1491
    See application file for complete search history.

(56) References Cited

U.S. PATENT DOCUMENTS

| | | | |
|---|---|---|---|
| 9,325,735 B1 * | 4/2016 | Xie | H04L 63/20 |
| 9,495,188 B1 * | 11/2016 | Ettema | G06F 9/45533 |
| 9,686,296 B1 * | 6/2017 | Murchison | H04L 63/1425 |
| 9,716,727 B1 * | 7/2017 | Seger | H04L 63/1491 |
| 9,954,870 B2 * | 4/2018 | Boss | H04L 63/1416 |
| 9,954,896 B2 * | 4/2018 | Hathaway | H04L 63/1416 |
| 10,044,675 B1 * | 8/2018 | Ettema | H04L 63/1491 |
| 2004/0128529 A1 * | 7/2004 | Blake | H04L 63/1441 726/25 |
| 2005/0210534 A1 * | 9/2005 | Krishnamurthy | H04L 63/145 726/23 |
| 2008/0018927 A1 * | 1/2008 | Martin | H04W 12/126 358/1.15 |
| 2008/0163354 A1 * | 7/2008 | Ben-Shalom | H04L 63/1441 726/12 |
| 2009/0144823 A1 * | 6/2009 | Lamastra | H04L 63/0227 726/22 |
| 2016/0127316 A1 | 5/2016 | Moskow | |
| 2017/0134405 A1 * | 5/2017 | Ahmadzadeh | H04L 63/1433 |
| 2017/0223052 A1 * | 8/2017 | Stutz | H04L 63/1433 |
| 2017/0331858 A1 * | 11/2017 | Clark, III | H04L 63/1416 |
| 2017/0353491 A1 * | 12/2017 | Gukal | H04L 63/1408 |
| 2018/0063191 A1 * | 3/2018 | Woronka | H04L 63/1491 |

OTHER PUBLICATIONS

Wang, Haifeng et al. "Dynamic Deploying Distributed Low-interaction Honeynet." JCP 7.3 (2012): 692-698.

\* cited by examiner

*Primary Examiner* — Harris C Wang
(74) *Attorney, Agent, or Firm* — Danielson Legal LLC

(57) ABSTRACT

Methods and devices for monitoring scan attempts in a network. Various embodiments provide enhancements to existing honeypot devices. These enhancements may include at least one of: (1) a port access module configured to make at least one honeypot port appear to be closed; (2) a mobility module configured to change the address of the honeypot within the network; (3) an emulation module configured to discover a network neighbor's profile and further configured to emulate the network neighbor's profile.

14 Claims, 8 Drawing Sheets

MONITORING SCAN ATTEMPTS IN A NETWORK

The present application claims the benefit of pending U.S. utility patent application Ser. No. 15/349,069, filed on Nov. 11, 2016, and issued as U.S. Pat. No. 10,447,734, on Oct. 15, 2019, the entire disclosure of which is incorporated by reference as if set forth in its entirety herein.

TECHNICAL FIELD

This invention generally relates to systems, devices, and methods for monitoring scan attempts on a network, and in particular to systems, devices, and methods for monitoring scan attempts so as to avoid detection by threat actors.

BACKGROUND

Due to its prevalence in today's society and popularity for connecting financial resources and data sources, the internet and connected networks have become a hub for criminal activity. To detect, monitor, and learn about criminal behavior, security personnel often implement one or more honeypot devices within a network. Honeypot devices are security mechanisms that can appear to be attractive targets to an outside observer (e.g., a threat actor), but nonetheless monitor the threat actor's behavior and may assist in defending the network from the threat actor.

Often times, however, honeypots are easily identified by threat actors. For example, when a threat actor surveys a network, they may first attempt to establish a connection with one or more devices on the network via a connection tool. The threat actor would then expect to receive one of two pieces of information from the connection tool based on the outcome of the connection attempt. They would expect to receive either (1) a notification that the port they have tried to connect to on the device is closed (based on a lack of response from the device); or (2) that the port they have tried to connect to is open, and that the next stage of the applicable protocol used to connect to that port should be conducted. If the threat actor receives neither, he or she may quickly conclude they are dealing with a honeypot.

Once the threat actor identifies a device as a honeypot, they may take steps to avoid the honeypot in future network activity. For example, the internet protocol (IP) addresses of these devices may be blacklisted and avoided in future interactions with the network.

A need exists, therefore, for methods and systems that overcome the above disadvantages of existing honeypot devices.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a virtual security appliance for monitoring scan attempts in a network. The virtual security appliance includes a first plurality of ports; and at least one of a port access module configured to make at least one of the first plurality of ports appear to be closed; and a mobility module configured to change the address of the virtual security appliance within the network.

In one embodiment, the port access module is configured to, in response to the receipt of a first connection attempt, record the first connection attempt without establishing the connection.

In one embodiment, the virtual security appliance further includes an emulation module configured to adjust the first plurality of ports to assume a predetermined first profile.

In one embodiment, the virtual security appliance further includes an emulation module configured to discover a network neighbor's profile and further configured to emulate the network neighbor's profile.

In one embodiment, the mobility module is configured to change the address of the virtual security appliance within the network at random, in accordance with a schedule, or when instructed by a user.

In one embodiment, the mobility module is configured to change the internet protocol (IP) address of the virtual security appliance.

In one embodiment, the port access module is configured to switch between a first profile comprising a plurality of closed ports and a second profile comprising a different plurality of closed ports at least when the mobility module is unable to change the address of the virtual security appliance.

In one embodiment, the virtual security appliance further includes a handshake module that is configured to provide credentials identifying the virtual security appliance as a honeypot device to at least one other device on the network in communication with the virtual security appliance.

In one embodiment, the virtual security appliance further includes a handshake module that is configured to scan a plurality of ports of the at least one other device in the network in a predetermined order to identify the virtual security appliance as a honeypot device.

In one embodiment, the plurality of ports are configured to execute a plurality of protocols.

In another aspect, embodiments relate to a method of monitoring scan attempts in a network. The method includes deploying at least one virtual security appliance with a first plurality of ports in the network; executing, via the at least one virtual security appliance, at least one of a port access module to make at least one of the first plurality of ports appear to be closed; and a mobility module to change the address of the virtual security appliance within the network; and reporting any received connection attempts to a control module in communication with the virtual security appliance.

In one embodiment, the method further includes in response to receiving a first connection attempt, recording the first connection attempt without establishing the connection via the port access module.

In one embodiment, the method further includes executing an emulation module to adjust the first plurality of ports to assume a predetermined first profile.

In one embodiment, the method further includes executing an emulation module to discover a network neighbor's profile and further configured to emulate the network neighbor's profile.

In one embodiment, the mobility module is configured to change the address of the virtual security appliance within the network at random, in accordance with a schedule, or when instructed by a user.

In one embodiment, the method further includes changing the internet protocol (IP) address of the virtual security appliance via the mobility module.

In one embodiment, the method further includes switching, via the port access module, between a first profile comprising a plurality of closed ports and a second profile comprising a different plurality of closed ports at least when the mobility module is unable to change the address of the virtual security appliance.

In one embodiment, the method further includes executing a handshake module that is configured to provide credentials that identify the virtual security appliance as a honeypot device to at least one other device on the network in communication with the virtual security appliance.

In one embodiment, the method further includes executing a handshake module that is configured to scan a plurality of ports of the at least one other device in a predetermined order to identify the virtual security appliance as a honeypot device.

In yet another aspect, embodiments relate to a system for monitoring scan attempts in a network. The system includes at least one virtual security appliance deployable in the network, wherein the at least one virtual security appliance includes a first plurality of ports and at least one of a port access module configured to make at least one of the first plurality of ports appear to be closed; a mobility module configured to change the address of the virtual security appliance within the network; and an emulation module configured to gather data regarding a second plurality of ports belonging to at least one other device on the network in communication with the virtual security appliance, and further configured to adjust the first plurality of ports to resemble the appearance of the second plurality of ports; and a control module in communication with the at least one virtual security appliance and configured to provide instructions to the at least one virtual security appliance.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
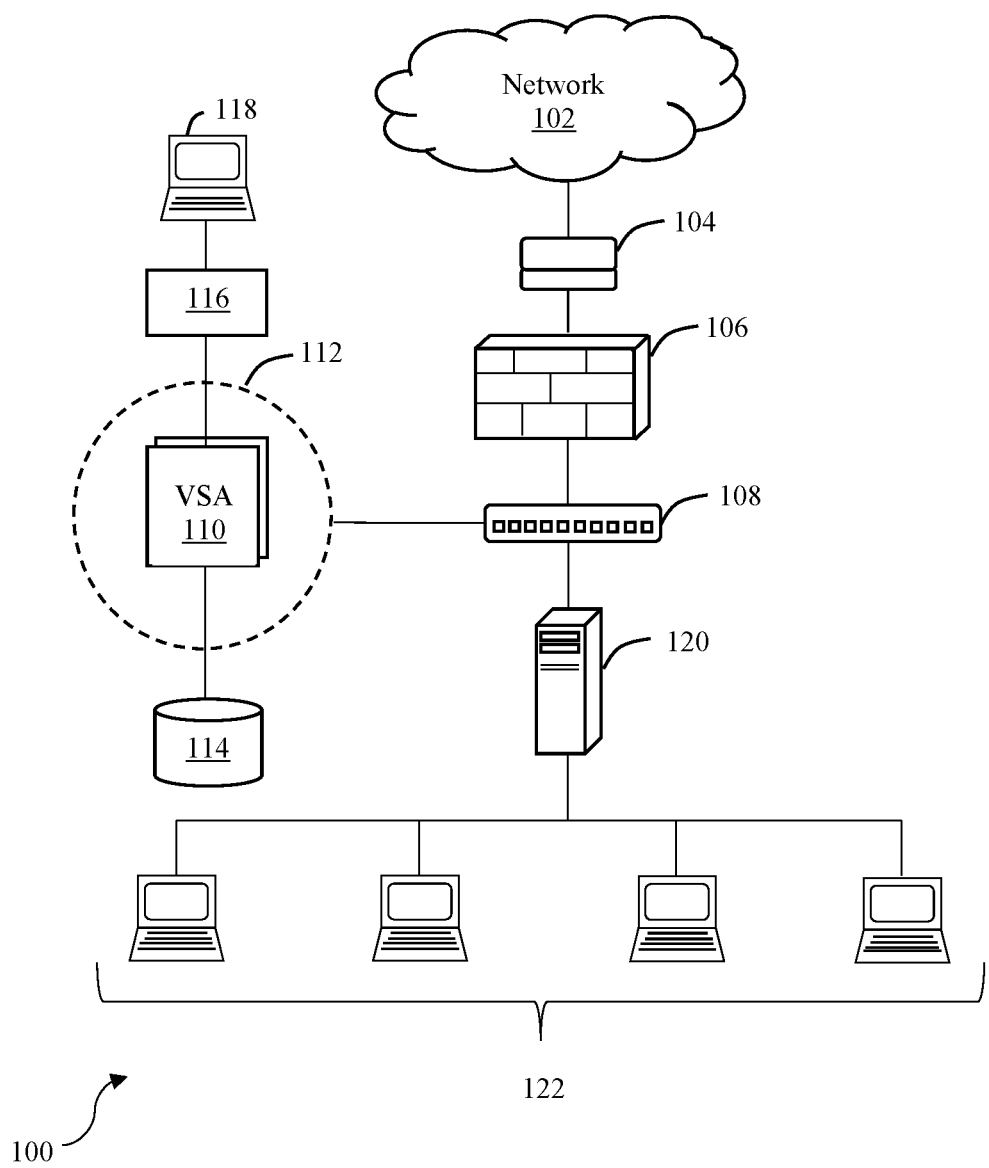
FIG. 1 depicts a system for monitoring scan attempts in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

As mentioned previously, existing techniques for monitoring scan attempts on a network rely on honeypot devices that are often easy detected by threat actors. Accordingly, threat actors may blacklist and avoid the honeypots in future network activity, thereby rendering the honeypots useless.

Various embodiments of the present invention provide enhancements to virtual security appliances (e.g., honeypot devices). First, the virtual security appliance of various embodiments may have the ability to have its ports appear closed to an external observer (e.g., a hacker or other type of threat actor). However, the virtual security appliance may nonetheless record or otherwise capture any traffic sent to the virtual security appliance.

Second, the virtual security appliance of various embodiments may have the ability to move around or within a network by changing its network address. This may make avoiding a known honeypot device more difficult for threat actors.

Third, the virtual security appliance of various embodiments may have the ability to gather information regarding the general network profile of devices in the network. The virtual security appliance may then make itself appear to be similar to these other devices in the network to "blend in" or otherwise not appear as a honeypot device to a threat actor.

FIG. 1 generally illustrates a network system 100 in accordance with one embodiment. The system 100 may include or otherwise be implemented in connection with a network 102 via one or more routers 104. The system 100 may further include a firewall 106 and an Ethernet hub or network switch 108 for connecting various devices on the system 100.

The system 100 may further include one or more virtual security appliances 110 such as honeypot devices. The virtual security appliance(s) 110 may be part of a demilitarized zone (DMZ) 112, i.e., a physical or logical subnetwork exposed to access from an outside network like the internet, for example. This zone 112 may include a plurality of virtual security appliances 110, in which case the DMZ 112 may be considered a honeynet area. Alternatively, the virtual security appliance 110 may be in the same network segment as most of the other computing resources, and inside the firewall. This placement enables the virtual security appliance 110 to detect malicious actors roaming or otherwise acting inside the network. The virtual security appliance(s) 110 may be in further connection with one or more databases 114, a control module 116, and a user interface 118. The user interface 118 may be operated by security personnel to see if and when the virtual security appliance 110 was scanned, as reported by the control module 116.

The switch 108 may further be in connection with a domain name server (DNS) 120 that associates domain names with the IP addresses of various hardware devices 122. One or more of the devices 122 may be part of a local area network (LAN), for example.

The system 100 illustrated in FIG. 1 is merely exemplary, and other types of devices and components in addition to or in lieu of those shown in FIG. 1 may be included. For example, the system 100 may also include modems, additional servers, wireless routers, wireless access points, etc.

The network 102 may link the various devices with various types of network connections. The network 102 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network 102 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GS) link, a cellular digital packet data (CDPD) link, a Research in Motion, Limited (RIM) duplex paging type device, a Bluetooth radio link, or an IEEE 802.11-based link.

The hardware devices 122 may be implemented as any type of device such as a PC, laptop, tablet, server, mobile device, or the like.

Figure 2:
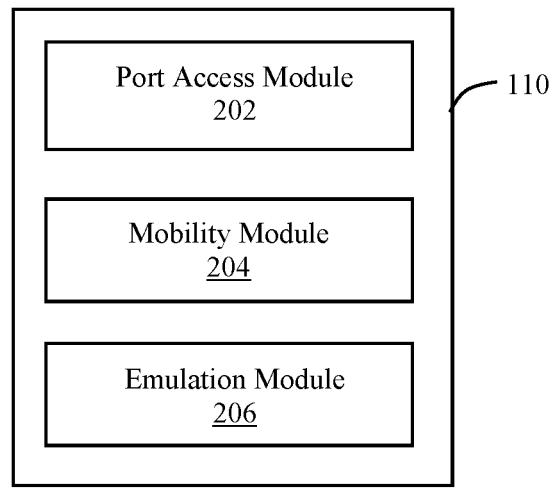
FIG. 2 illustrates the virtual security appliance of FIG. 1 in accordance with one embodiment.

FIG. 2 illustrates the virtual security appliance 110 of FIG. 1 in more detail. As shown, the virtual security appliance(s) 110 may further include a port access module 202, a mobility module 204, and an emulation module 206.

When data is sent to existing honeypot devices, the data is captured and recorded, but typically nothing else happens. As mentioned previously, the sender (i.e., a threat actor) generally expects to discern either that (1) the port they have tried to connect to is closed; or (2) the port they have tried to connect to is open, and that the next stage of the protocol used to connect to that port should be conducted. However, if the targeted device does not respond, the sender may quickly realize they are dealing with a honeypot device. Once a threat actor identifies a honeypot device, they may take steps to avoid the honeypot device in future network activity, thereby rendering the honeypot device ineffective.

The port access module 202 may therefore configure the virtual security appliance 110 to be more difficult to detect by threat actors. At a high level, the port access module 202 may present a network presence with many ports that appear to be closed, but are nonetheless able to capture any scan attempts and/or traffic sent to the virtual security appliance 110. In other words, the virtual security appliance 110 may recognize when something is trying to scan it on any port, but some (or all) of the ports appear to be closed from the point of the view of the scanner.

Figure 3:
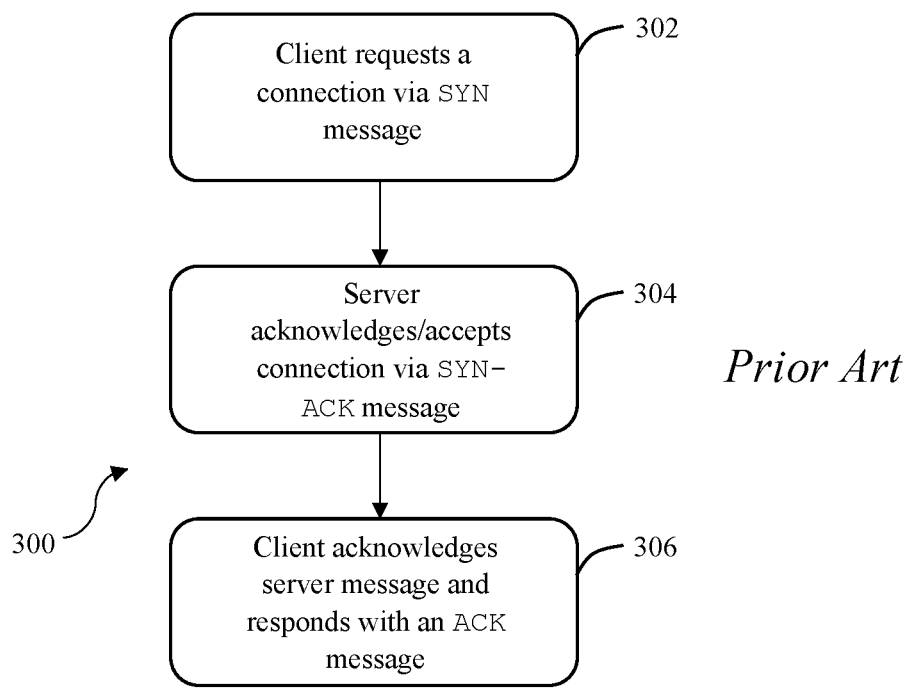
FIG. 3 illustrates an existing method of establishing a transmission control protocol (TCP) connection between two devices.

FIG. 3 depicts a flowchart of an existing method 300 of establishing a transmission control protocol (TCP) connection. First, and as shown in step 302, a client (e.g., a user) attempts to establish a connection with a server by first sending a SYN message to the server. In step 304, the server acknowledges this connection request by responding to the client with a SYN-ACK message. In step 306, the client responds by sending an ACK message, and the connection is established.

Once the connection phase is completed and the connection is established in method 300, data may be transmitted between the client and server (i.e., the data transmission phase). In the data transmission phase, existing honeypot devices may record data from incoming scans, but never respond back to the scanner. Again, the sender may become suspicious because the connection has been established but no information is communicated back to the sender.

Figure 4:
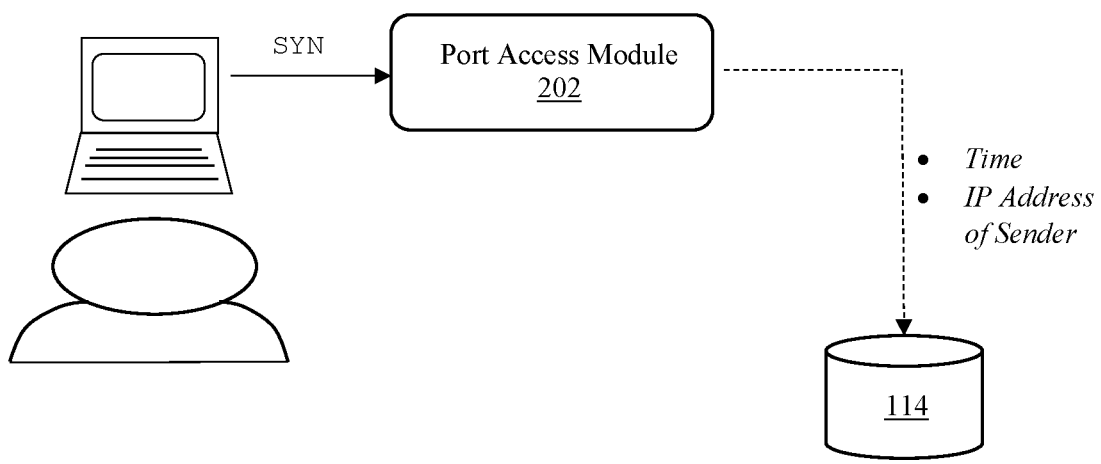
FIG. 4 illustrates a process of recording a scan attempt in accordance with one embodiment.

In accordance with the features of various embodiments described herein, the monitoring of the scanner may occur during the connection establishment phase. The port access module 202 may record the connection attempt (e.g., the TCP SYN message). This scan attempt may be stored in database 114 as shown in FIG. 4, for example.

Accordingly, the scanner is led to believe that the port(s) is simply closed, and a connection is never established. This is in contrast to existing techniques, in which case a connection is established, but data is never returned to the sender (which, as noted, is suspicious to the sender). It is also contemplated that alternate embodiments may involve establishing a connection and then returning data back to sender that simulates various protocols, programs, or devices.

Referring back to FIG. 2, the mobility module 204 of the virtual security appliance 110 may be configured to move the virtual security appliance 110 to around a network by changing its network address. This ability makes it more difficult to avoid (even if the virtual security appliance 110 has been previously identified as a honeypot device). As stated previously, once a honeypot device has been identified by a threat actor, the threat actor may avoid that honeypot device in all future network activity.

Accordingly, the mobility module 204 may move the virtual security appliance 110 to different locations on the network such that it is hosted on different IP addresses at different times. In one embodiment, the virtual security appliance 110 may be hosted on a hypervisor or in some other network with broad network visibility and control (e.g., an ESX server). In this type of embodiment, the host may assign different IP addresses to the virtual machine that hosts the honeypot device. The host may assign the different IP addresses at random, in accordance with a schedule (e.g., every 2 hours), or when instructed to by a user such as security personnel.

In another embodiment, the virtual security appliance 110 may be hosted on a server that does not have broad network visibility or control. In this embodiment, the host could direct the mobility module 204 to perform a DHCP release/renew operation to cycle its IP address. Additionally, the MAC address associated with the virtual security appliance 110 may also be altered so that the DHCP server returns a different IP address.

Referring back to FIG. 2, the emulation module 206 may have the ability to configure the virtual security appliance 110 to mimic its neighbors' network profiles. By resembling its neighbors, the virtual security appliance 110 becomes more difficult to detect.

For example, when a virtual security appliance such as a honeypot device is deployed in a network it may have all of its ports open (or closed). Even if the virtual security appliance 110 was configured to have select ports open and select ports closed it may appear significantly different than its neighbors. These differences in appearance may make a honeypot device noticeable to threat actors. Accordingly, embodiments of the present invention include functionality to determine the network profile(s) of one or more neighboring network devices on the network and to configure the virtual security appliance to match that profile(s).

Figure 5:
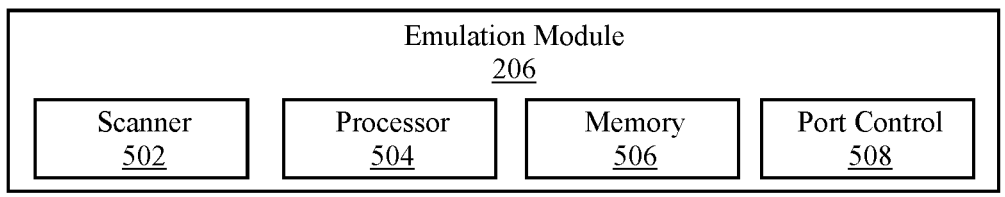
FIG. 5 illustrates the emulation module of FIG. 2 in accordance with one embodiment.

FIG. 5 illustrates the emulation module 206 of FIG. 2 in more detail. The emulation module 206 may include a scanner 502, a processor 504, memory 506, and a port control module 508.

Figure 6:
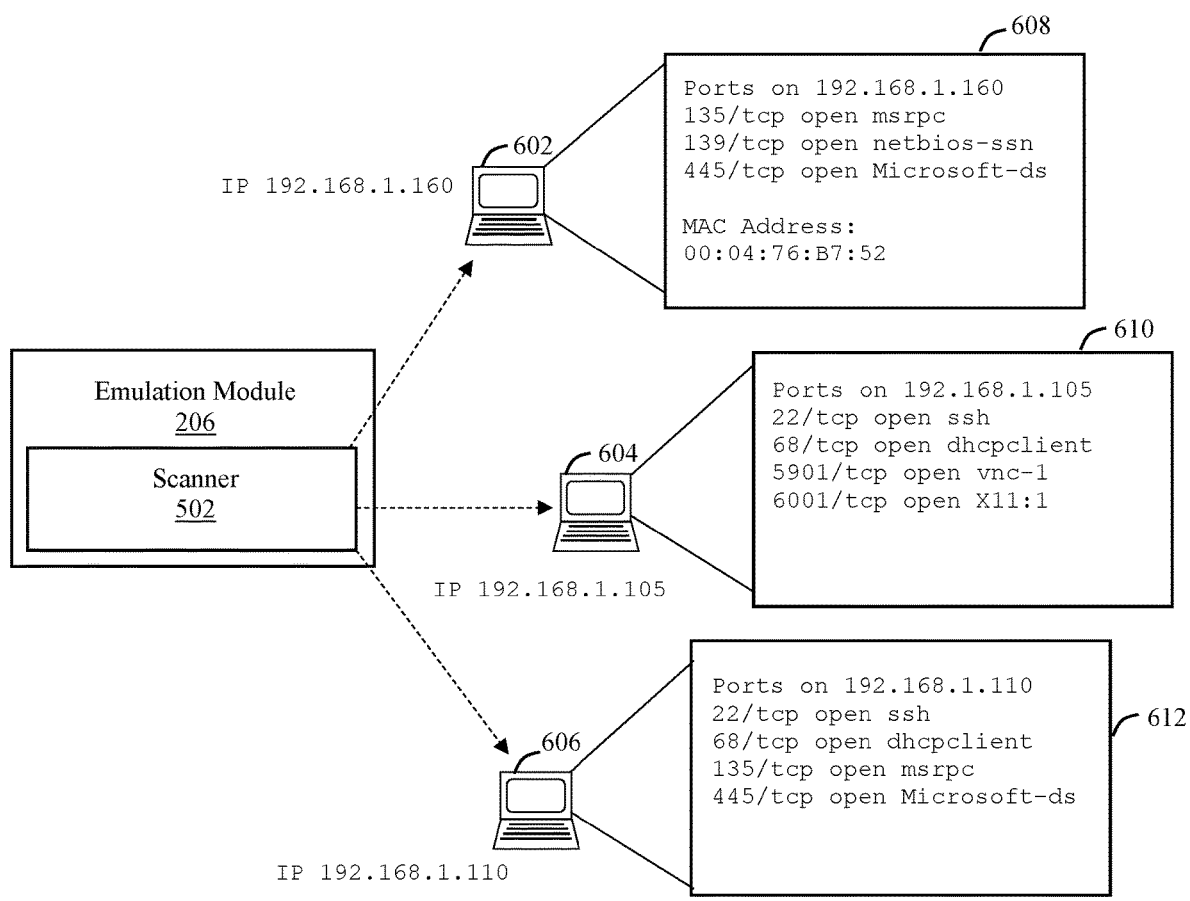
FIG. 6 illustrates a network scan performed by the emulation module of FIG. 5 in accordance with one embodiment.

The scanner 502 may be configured to scan devices that are near the virtual security appliance 110 within the network 102 (e.g., devices with similar IP addresses). FIG. 6, for example, shows the scanner 502 scanning devices 602, 604, and 606 to determine their respective network profiles 608, 610, and 612. Although three devices 602, 604, and 606 are scanned in FIG. 6, it is contemplated that more than three or fewer than three devices may be scanned.

The decision of which devices to scan may be based on the devices' location in the network with respect to the virtual security appliance 110. More specifically, the decision of which devices to scan may be based on the IP addresses of the virtual security appliance and the other devices in the network.

For example, the method for choosing nearby IP addresses may involve looking for a subnet of devices that are in the same CIDR block as the IP address(es) of the virtual security appliance 110. In these embodiments, the CIDR block prefix should be small enough to enable a quick, non-disruptive scan, or large enough such that a small, random sample would be sufficiently representative of the neighboring devices of the virtual security appliance 110.

The scanner 502 may be configured as any type of scanning device such NMAP® network discovery, Angry IP Scanner, Superscan, or the like. The exact scanning tool or technique may vary as long as it can gather information regarding the network profiles of various devices.

The network profiles 608, 610, and 612 of devices 602, 604, 606, respectively, may then be communicated to the processor 504 of the emulation module 206. The processor 504 may be any hardware device capable of executing instructions stored on memory 506 to process data regarding the network profiles 608, 610, and 612. The processor 504 may be a microprocessor, a field programmable gate array (FPGA), an application-specific integrated circuit (ASIC), or a similar type of device. In some embodiments, such as those relying on one or more ASICs, the functionality described as being provided in part via software may instead be configured into the design of the ASICs and, as such, the associated software may be omitted.

The processor 504 may analyze the obtained network profiles of the scanned devices. For example, the processor 504 may be configured to determine which ports of the various scanned devices tend to be open most frequently and which ports tend to be closed most frequently. Accordingly, it may be desirable for the virtual security appliance 110 to have the same ports open and the same ports closed as its neighbors to make the virtual security appliance 110 appear similar to its neighbors.

The analysis of the network profiles, and the subsequent findings such as which ports tend to be open (or closed), may be communicated to the port control module 508. The port control module 508 may then adjust the appropriate ports on the virtual security appliance as necessary. For example, the port control module 508 may instruct the port access module 202 to make certain ports appear to be closed in accordance with the techniques discussed above. Additionally or alternatively, the port control module 508 may simulate service actions by making open ports respond like real services.

In some embodiments, the virtual security appliance 110 may switch between a network profile of a honeypot device (e.g., with all ports open all of the time) and a conventional network-connected device (e.g., a non-honeypot device such as an SMTP server). This may create the appearance that the virtual security appliance 110 is moving around the network even though the IP address of the virtual security appliance 110 has not changed. This may be desirable if, for example, the mobility module 204 is unable change the address of the virtual security appliance 110.

Figure 7:
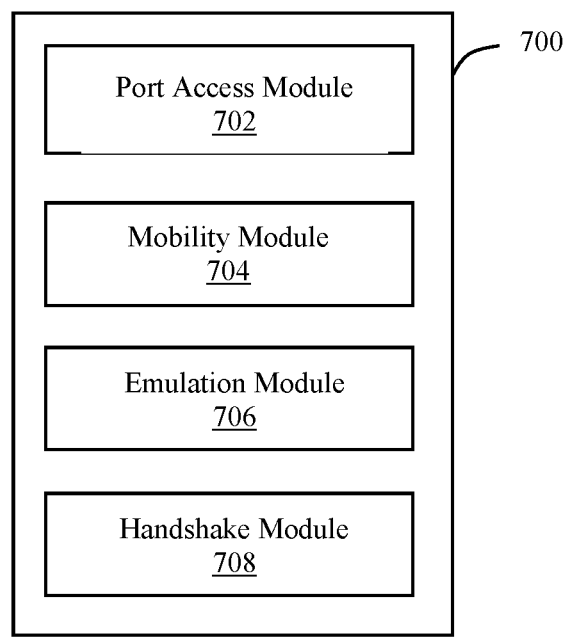
FIG. 7 illustrates the virtual security appliance of FIG. 1 in accordance with another embodiment.

FIG. 7 depicts a virtual security appliance 700 in accordance with another embodiment. The virtual security appliance 700 may include a port access module 702, a mobility module 704, and an emulation module 706. The port access module 702, mobility module 704, and the emulation module 706 may be similar to the port access module 202, mobility module 204, and emulation module 206 discussed above in connection with FIG. 2, respectively.

The virtual security appliance 700 of FIG. 7 may also include a handshake module 708. In accordance with various embodiments, the handshake module 708 may be in operable communication with the emulation module 706 and may introduce the virtual security appliance 700 as a honeypot device when the emulation module 706 is scanning neighboring devices.

For example, the virtual security appliance 110 may be placed in an area in which some of its neighbors are honeypot devices. In this case, the emulation module 206 may inadvertently be identified as a threat actor by the existing honeypot devices when scanning the devices to learn about their network profiles.

Accordingly, the handshake module 708 may identify the virtual security appliance 700 as a honeypot device to other honeypot devices in the network so that the existing honeypots do not report the scan attempts. For example, the handshake module 708 may be configured to scan the ports of devices in the network in a predetermined order. The existing honeypot devices may be configured to recognize this particular scanning order as actions performed by a friendly virtual security appliance 700 and not that of a hostile threat actor.

The scans can also be prescheduled and/or occur regularly at certain time intervals. For example, the virtual security appliance 700 may be configured to perform a scan of its surrounding neighbors once every hour. The existing honeypot devices in the area may be configured to recognize these periodic scans as coming from a friendly virtual security appliance 700, and not a threat actor, and therefore they will not issue a report notifying an operator of the scan.

Other embodiments may implement more specific authentication and authorization actions to let the existing honeypot devices know that a virtual security appliance 700 is authorized to scan. For example, in some embodiments, a virtual security appliance 700 may authenticate via cryptographic secrets. The target(s) may then check with an authorization authority to determine whether the virtual security appliance 700 should be scanning at that point in time.

Figure 8:
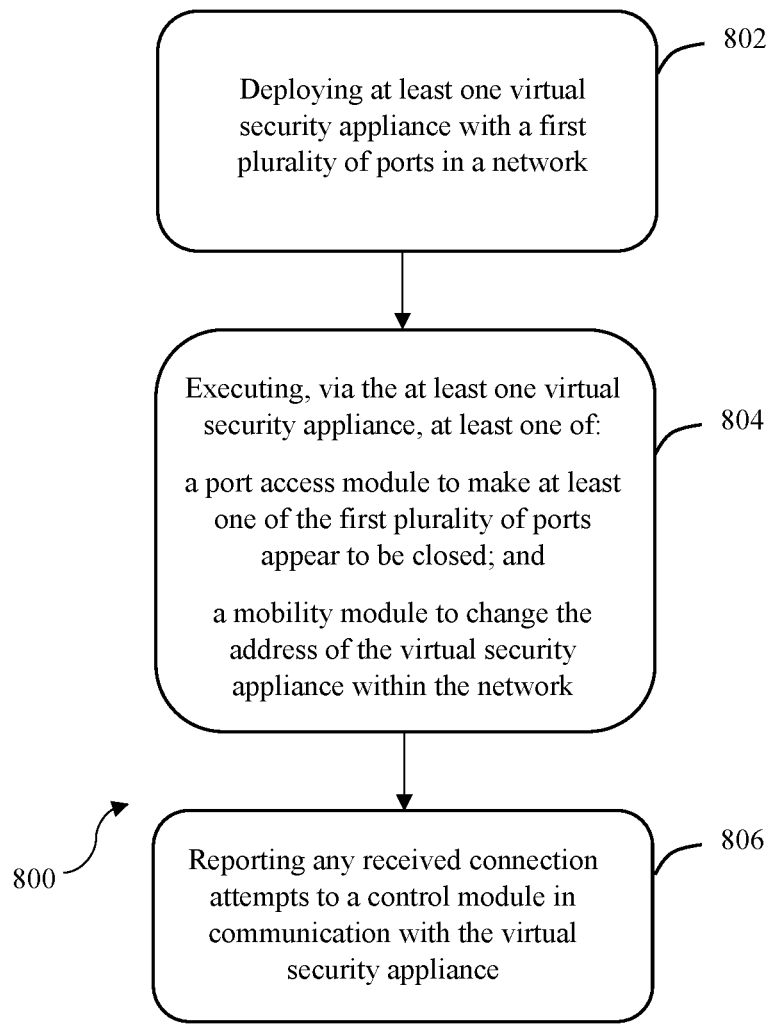
FIG. 8 depicts a flowchart of a method of monitoring scan attempts in accordance with one embodiment.

FIG. 8 depicts a flowchart of a method 800 of monitoring scan attempts in a network in accordance with one embodiment. Step 802 involves deploying at least one virtual security appliance with a first plurality of ports in a network. This virtual security appliance may be similar to the virtual security appliances of FIGS. 1 and 7, for example.

Step 804 involves executing, via the at least one virtual security appliance, at least one of: a port access module to make at least one of the first plurality of ports appear to be closed; and a mobility module to change the address of the virtual security appliance within the network. It is noted that not all modules of the virtual security appliances 110 and 700 are required, and any combination of the various modules may be used or excluded.

The port access module may be executed to make at least one of the plurality of ports of the virtual security appliance appear to be closed. As mentioned previously, this makes the virtual security appliance harder to detect, as threat actors are less inclined to believe they are dealing with a honeypot device when they receive a response that a port is closed, as opposed to no response at all.

Additionally or alternatively, the mobility module may be executed to change the address of the virtual security appliance within the network. As discussed above, the mobility module may, e.g., perform a DHCP release/renew operation to cycle the IP address of the virtual security appliance. The mobility module may be configured to change the address of the virtual security appliance at random, in accordance with a schedule, or when instructed to by a user. Accordingly, this makes the virtual security appliance harder to detect/avoid as the virtual security appliance does not keep the same IP address.

Step 806 involves reporting any received connection attempts (scans) to a control module in communication with the virtual security appliance. Connection attempts may be indicative of a threat actor attempting to survey the virtual security appliance or the surrounding network, as there may be no other reason for any benign users or systems to contact the virtual security appliance (unless it is another virtual security appliance attempting to gather data regarding network profiles, as discussed previously).

In any event, any unauthorized scans may be reported by the control module 116 to the user interface 118. The user interface 118 may be implemented as a PC, laptop, mobile device, tablet, or the like, and may inform an operator such as security personnel of the detected scan. The operator may then be more inclined to follow up or otherwise monitor future activity on the network or by the scanning device.

Figure 9:
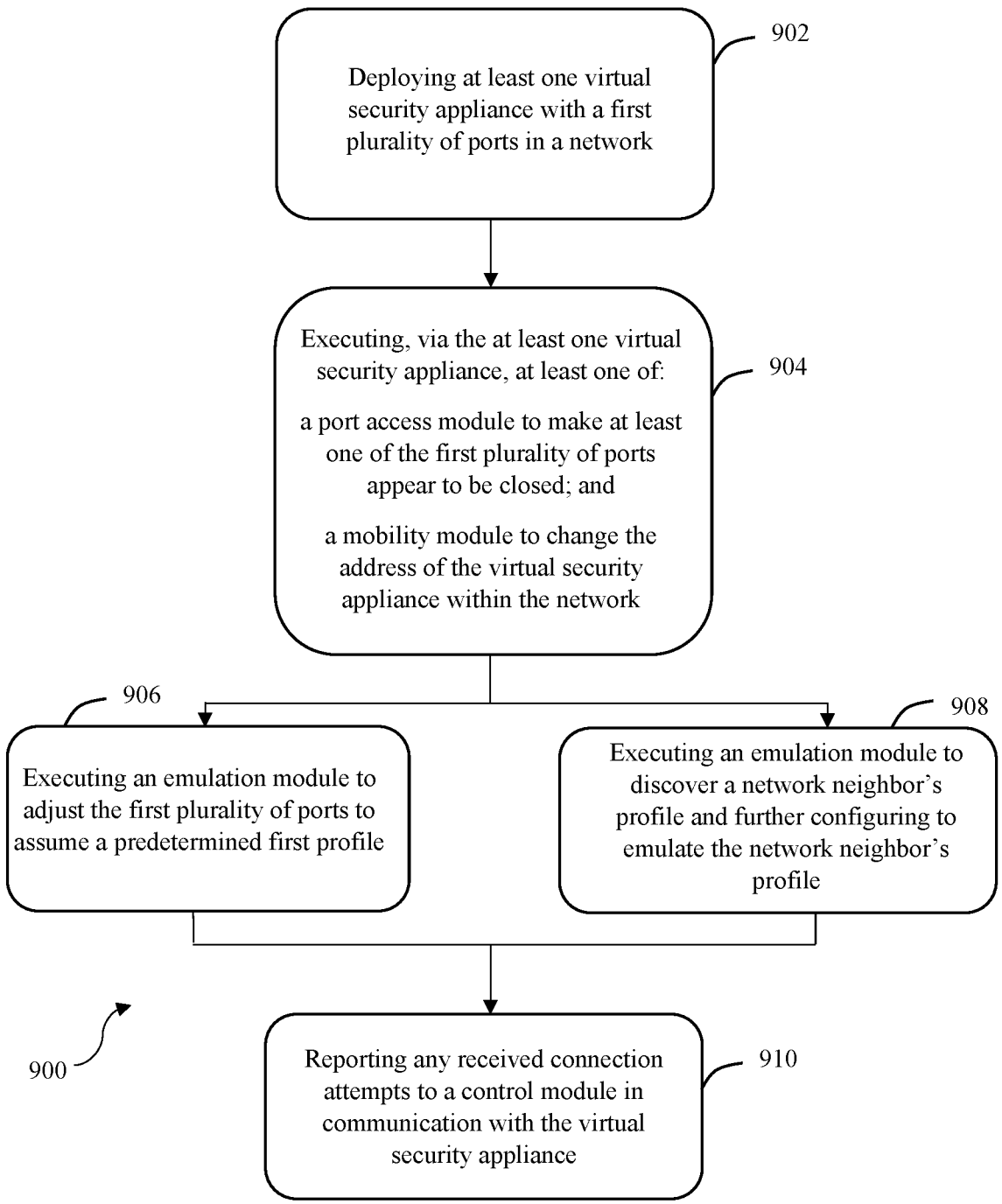
FIG. 9 depicts a flowchart of a method of monitoring scan attempts in accordance with another embodiment.

FIG. 9 depicts a flowchart of a method 900 of monitoring scan attempts in accordance with another embodiment. Steps 902, 904, and 910 are similar to steps 802, 804, and 806, respectively, of FIG. 8 and are not repeated here.

Method 900 also includes at least one of steps 906 and 908. Step 906 involves executing an emulation module to adjust the first plurality of ports to assume a predetermined first profile. This emulation module may be similar to the emulation modules 206 or 706 of FIGS. 2 and 7, respectively. The emulation module may be configured to assume this first profile upon deployment. Additionally, the first profile may be a predetermined profile that is intended to present the virtual security appliance as another well-known network device (e.g., an LDAP server).

Step 908 involves executing an emulation module to discover a network neighbor's profile and further configuring to emulate the network neighbor's profile. Step 908 may be performed in addition to or in lieu of step 906. As discussed above, the emulation module may perform a scan of nearby devices (i.e., devices with similar IP addresses) to gather data regarding the network profiles of the nearby devices. The network profiles of the devices may relate to which ports are open or closed on the devices.

The emulation module may then adjust the network profile of the virtual security appliance to resemble the network profiles of the nearby devices. By emulating the network profiles of the nearby devices, the virtual security appliance is not as detectable as it is closer in appearance to other devices. Accordingly, threat actors may be less suspicious of the virtual security appliance than they would be otherwise.

Figure 10:
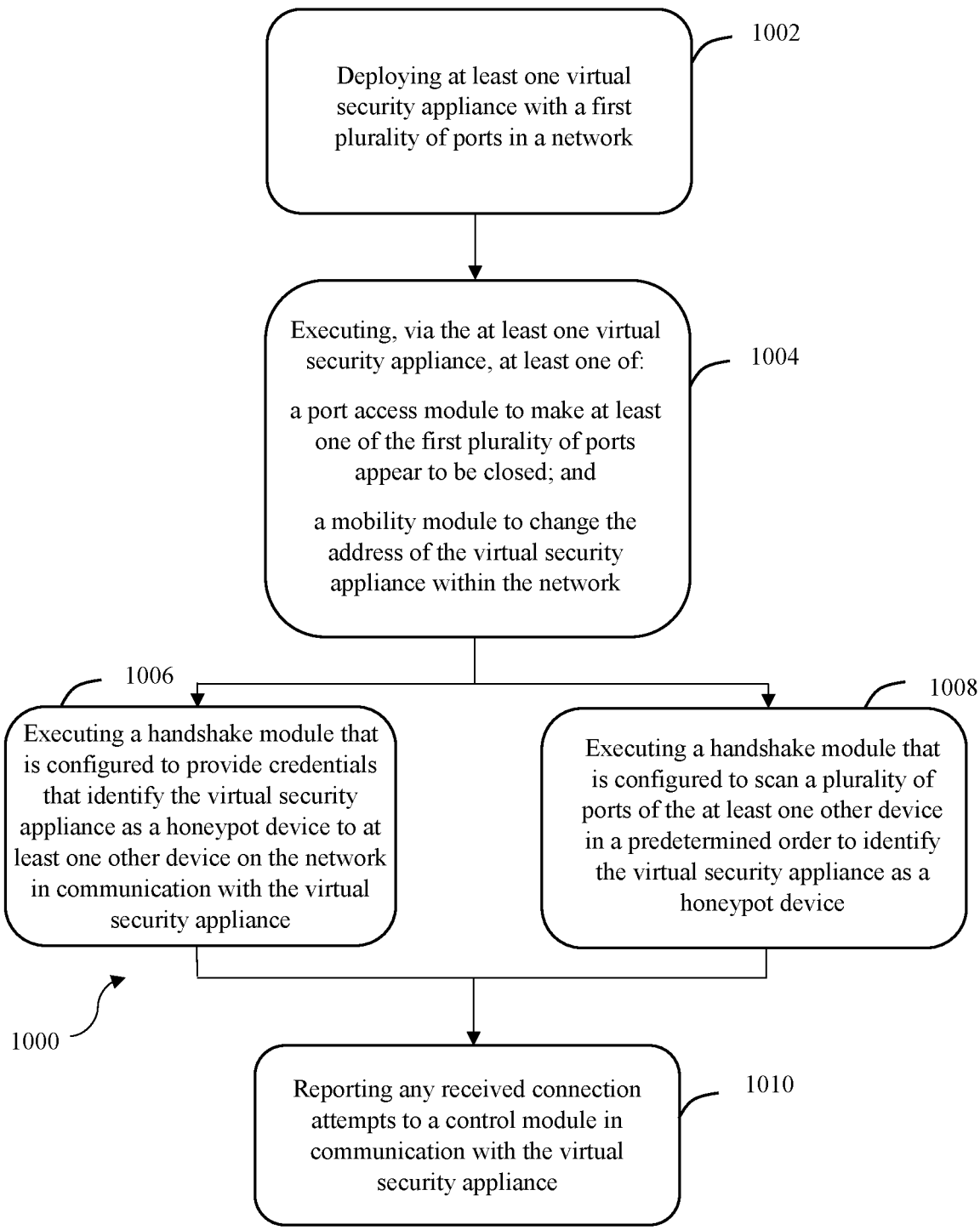
FIG. 10 depicts a flowchart of a method of monitoring scan attempts in accordance with still another embodiment.

FIG. 10 depicts a flowchart of a method 1000 of monitoring scan attempts in accordance with another embodiment Steps 1002, 1004, and 1010 are similar to steps 802, 804, and 806, respectively, of FIG. 8 and are not repeated here.

Step 1006 involves executing a handshake module that is configured to provide credentials that identify the virtual security appliance as a honeypot device to at least one other device on the network in communication with the virtual security appliance. This handshake module may be similar to the handshake module 708 of FIG. 7.

As discussed above, the handshake module may identify the virtual security appliance as a honeypot device while the emulation module is performing the network profile scans. By informing the other network devices (which may also include honeypot devices) that the virtual security appliance is a honeypot device, the other existing honeypot devices will not be triggered and will not report a scan attempt.

Step 1008 may be performed in addition to or in lieu of step 1006. Step 1008 involves executing a handshake module that is configured to scan a plurality of ports of the at least one other device in a predetermined order to identify the virtual security appliance as a honeypot device.

This provides an additional or alternative way for the virtual security appliance to scan nearby devices without arousing suspicion. The pre-existing network devices in the area may be configured to recognize that having at least some of its ports scanned in a particular order is indicative that a virtual security appliance is simply performing a permitted network scan. Accordingly, any existing devices will not be triggered or send a report of the detected scan.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for operating a virtual security appliance, the method comprising:
   deploying at least one virtual security appliance with a first plurality of ports in the network;
   introducing the virtual security appliance as a honeypot device to at least one other device on the network so the device does not report scan attempts by the virtual security appliance;
   scanning the device using the virtual security appliance to determine a first profile; and
   selectively switching the first plurality of ports of the virtual security appliance between resembling the first profile and a honeypot profile.

2. The method of claim 1 further comprising scanning ports of the device in a predetermined order to introduce the virtual security appliance as a honeypot device.

3. The method of claim 1 wherein introducing the virtual security appliance as the honeypot device includes scanning the device at prescheduled intervals.

4. The method of claim 1 wherein introducing the virtual security appliance as the honeypot device includes authenticating the virtual security appliance via cryptographic secrets.

5. The method of claim 1 further comprising selecting at least one device to scan based on the at least one device's location.

6. The method of claim 5 wherein selecting the at least one device to scan based on the device's location includes selecting the device based on the device's IP address.

7. The method of claim 5 wherein selecting the at least one device to scan based on the device's location includes selecting the device based on the device being in the same CIDR block as the at least one virtual security appliance.

8. A virtual security appliance comprising:
a first plurality of ports; and an emulation module comprising a hardware processor configured to:
introduce the virtual security appliance as a honeypot device to at least one other device on a network so the device does not report scan attempts by the virtual security appliance,
scan the device to determine a first profile, and selectively switch the first plurality of ports between resembling the first profile and the honeypot profile.

9. The virtual security appliance of claim 8 wherein the emulation module introduces the virtual security appliance as a honeypot device scanning ports of the device in a predetermined order.

10. The virtual security appliance of claim 8 wherein the emulation module introduces the virtual security appliance as a honeypot device by scanning the device at prescheduled intervals.

11. The virtual security appliance of claim 9 wherein the emulation module introduces the virtual security appliance as a honeypot device by authenticating the virtual security appliance via cryptographic secrets.

12. The virtual security appliance of claim 8 wherein the virtual security appliance selects at least one device to scan based on the at least one device's location.

13. The virtual security appliance of claim 12 wherein the virtual security appliance selects the at least one device based on the device's IP address.

14. The virtual security appliance of claim 12 wherein the virtual security appliance selects the at least one device based on the device being in the same CIDR block as the at least one virtual security appliance.

* * * * *